United States Patent [19]

Kubota et al.

[11] Patent Number: 4,759,954
[45] Date of Patent: Jul. 26, 1988

[54] MAGNETIC RECORDING MEDIUM AND PREPARATION

[75] Inventors: Yuichi Kubota; Yasufumi Takasugi; Yousuke Hitomi; Tsunehiko Ikarashi; Fuminori Tokuda, all of Nagano, Japan

[73] Assignee: TDK Corporation, Tokyo, Japan

[21] Appl. No.: 939,033

[22] Filed: Dec. 8, 1986

[30] Foreign Application Priority Data

Dec. 10, 1985 [JP] Japan ................... 60-277403

[51] Int. Cl.⁴ .................. G11B 5/70; G11B 5/82
[52] U.S. Cl. .................. 427/128; 427/48; 427/130; 427/372.2; 428/304.4; 428/306.6; 428/694; 428/695; 428/900
[58] Field of Search .......... 428/304.4, 306.6, 694, 428/695, 900; 427/128, 48, 130, 372.2

[56] References Cited

U.S. PATENT DOCUMENTS 4,091,158 12/1978 Kasuga et al. .............. 428/900
4,163,823 8/1979 Legras et al. ................ 427/48
4,450,199 5/1984 Tadokoro et al. ........... 428/900
4,546,035 10/1985 Ko et al. ..................... 428/694
4,567,096 1/1986 Piltingsrud et al. .......... 428/900
4,626,463 12/1986 Fujishiro et al. ............. 428/695

FOREIGN PATENT DOCUMENTS 0129721 1/1985 European Pat. Off. .

Primary Examiner—Paul J. Thibodeau
Attorney, Agent, or Firm—Oblon, Fisher, Spivak, McClelland & Maier

[57] ABSTRACT

In a magnetic recording medium comprising a substrate and a magnetic layer thereon, the magnetic layer is formed by coating a composition of a binder, preferably radiation-curable binder and a needle magnetic material, passing the coating through a magnetic field to forcedly re-orient the magnetic particles to form pores having an average pore area of $6 \times 10^{-5}$ to $7 \times 10^{-1}$ $\mu m^2$, and curing the coating, thereby minimizing output fluctuation and improving durability. Preferably lubricant is present in the pores.

4 Claims, 1 Drawing Sheet

MAGNETIC RECORDING MEDIUM AND PREPARATION

BACKGROUND OF THE INVENTION

This invention relates to a magnetic recording medium and a method for the manufacture of the same. More particularly, it relates to a disk-shaped magnetic recording medium comprising a magnetic layer containing needle magnetic powder and binder on a flexible nonmagnetic substrate, and a method for the manufacture of this medium.

A variety of disk-shaped magnetic recording media have seen practical application as floppy disks. With such media, recording and playback are conducted by bringing the magnetic head into circumferential sliding contact with the disk while the disk is being rotated. If magnetic particles should be oriented in a fixed direction in the magnetic layer of the medium, maximum and minimum outputs will occur in alternation with rotation of the disk, giving rise to the fluctuations in output known as modulation.

This modulation is caused by such factors as the degree of orientation of the needle magnetic particles. Too high a modulation is undesirable in practical applications as this prevents the accurate reading of information recorded on the medium. Percent modulation is normally computed with the formula:

$$(A-B)/(A+B) \times 100\%$$

where A is the track average of the maximum amplitude and B is the track average of the minimum amplitude.

There exists also another type of output fluctuation called high-pass modulation, which depends primarily on the surface smoothness of the medium. As shown in FIG. 1, this is an output fluctuation ratio predominantly determined by the track average of the difference between maximum amplitude A' and minimum amplitude B'. The high-pass modulation too should be as low as possible.

As already noted above, disk-shaped media normally rotate at a high speed of at least several hundreds of revolutions per minute, and in some cases several thousands of revolutions per minute while sliding over the front face of a magnetic head. The result is rapid wear and degradation of the medium, which can be a major factor behind a decline in reliability. There is a strong demand for improved durability of the medium. Many attempts have been made for enhancing durability, but to a less satisfactory extent.

SUMMARY OF THE INVENTION

An object of this invention is to provide a magnetic recording medium having minimized output fluctuations, particularly a minimized high-pass modulation, and improved durability.

According to a first aspect of the present invention, there is provided a magnetic recording medium comprising a substrate having opposed major surfaces and at least one magnetic layer formed on the major surface, the magnetic layer comprising a binder and a needle magnetic material, wherein the magnetic layer is provided with pores having an average pore area of $6 \times 10^{-5}$ to $7 \times 10^{-1}$ $\mu m^2$.

In one preferred embodiment, the magnetic layer has a porosity of 5 to 30%.

According to a second aspect of the present invention, there is provided a method for preparing a magnetic recording medium, comprising:

applying a magnetic coating composition comprising a needle magnetic material and a binder to a nonmagnetic substrate to form a magnetic layer, and subjecting the magnetic layer to random orientation to form therein pores having an average pore area of $6 \times 10^{-5}$ to $7 \times 10^{-1}$ $\mu m^2$.

According to a third aspect of the present invention, there is provided a magnetic recording medium comprising a substrate having opposed major surfaces and at least one magnetic layer formed on the major surface, the magnetic layer comprising a binder and a needle magnetic material, wherein the magnetic layer is provided with pores having an average pore area of $6 \times 10^{-5}$ to $7 \times 10^{-1}$ $\mu m^2$ and a lubricant is present in the pores.

According to a fourth aspect of the present invention, there is provided a method for preparing a magnetic recording medium, comprising:

applying a magnetic coating composition comprising a needle magnetic material and a binder to a nonmagnetic substrate to form a magnetic layer, subjecting the magnetic layer to random orientation to form therein pores with an average pore area of $6 \times 10^{-5}$ to $7 \times 10^{-1}$ $\mu m^2$, and applying a lubricant at least into the pores.

BRIEF DESCRIPTION OF THE DRAWING

The only drawing.

DESCRIPTION OF THE PREFERRED EMBODIMENTS

Figure 1:
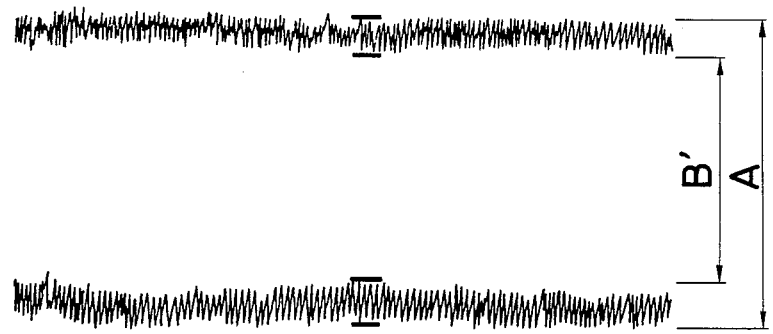
FIG. 1 illustrates output fluctuation waveforms in order to demonstrate what is meant by the term "high-pass modulation".

The magnetic recording medium of the invention has a magnetic layer containing a needle magnetic powder and a binder on a nonmagnetic substrate. Numerous pores with an average pore area of $6 \times 10^{-5}$ to $7 \times 10^{-1}$ $\mu m^2$, and preferably $2 \times 10^{-3}$ to $7 \times 10^{-1}$ $\mu m^2$, are present on the surface of the magnetic layer. An average pore area of less than $6 \times 10^{-5}$ $\mu m^2$ adversely affects durability. At values above $7 \times 10^{-1}$ $\mu m^2$, however, output fluctuations, and in particular high pass modulation, become greater and dropouts increase.

The porosity of the magnetic layer, which is the ratio of the total volume of the pores to the total volume of the magnetic layer, preferably ranges from 5 to 30%, more preferably from 15 to 30%. When the porosity exceeds 30%, surface smoothness of the medium deteriorates, which is undesirable for the electromagnetic properties. On the other hand, if the porosity is less than 5%, the impact moderating effect during use of the medium disappears, resulting in inferior durability.

The average pore area is measured by electron microscopy. A photomicrograph of the surface of the magnetic layer is taken with a scanning electron microscope (SEM), the surface integrals for each of the imaged pores calculated, and the average value for these taken as the average pore area.

Describing this process in greater detail, a single field of view is selected on the surface of the magnetic layer to be examined, the selected area observed at a magnification of 5,000–10,000X, and the pore surface area within this field of view measured. This may be done through image analysis using a television camera. One such technique involves dividing the image up into a predetermined number of picture elements. The picture elements are classified into 16 gradations, for example, with only those elements having the maximum gradation being regarded as black; all elements with the other gradations are regarded as white. The picture elements are broken down into gradations in order to eliminate measurement error due to other scattering objects. The average pore area may be determined in this way from photomicrographic images of the magnetic layer surface.

Porosity is preferably determined by a mercury injection method. Using a known mercury injection-type pore diameter measuring device, the sample is placed within mercury, to which pressure is applied. The relationship between the loss of mercury and the applied pressure is determined. The pore radius r is given by the equation:

$$r = -2\sigma \cos \theta / P$$

where P is the applied pressure, $\sigma$ is the surface tension, and $\theta$ is the angle of contact. Based on the mercury loss-to-applied pressure relationship, a relative cumulative curve of the pore diameter 2r is then plotted as a function of the percent distribution of pores on the ordinate. This cumulative curve is then differentiated.

Several peaks normally arise on the derived curve, but some of them generally appear at positions far remote from values obtained with the electron micrographic method described above and are of low intensity. Hence, provided that the highest peak has an average pore area $\pi r^2$, the percent porosity is calculated as follows:

$$\text{porosity} = \frac{\text{sum of pore surface areas}}{\text{surface area of magnetic layer}} \times 100\%$$

The pores in the magnetic layer normally are not of uniform shape, having instead various different shapes. The pores are formed primarily by random orientation during the manufacturing process, as described below.

Random orientation may be carried out, for example, by applying a magnetic field in a transverse direction across the substrate or an alternating magnetic field before the magnetic layer is cured. Natural orientation is mechanically imparted to magnetic particles in a longitudinal direction of the substrate when the magnetic layer is formed on the substrate by coating. The application of a magnetic field other than in the longitudinal direction of the substrate randomizes the direction of orientation of the magnetic particles, and at the same time, forcibly opens pores in the magnetic layer.

Typical methods that may be applied for the random orientation treatment include those described in Japanese patent application Kokai Nos. 54-159204, 57-198545, 57-189344, 57-189345, 58-141446, 60-124029, and 60-1387373, and Japanese patent application No. 60-228530.

As a consequence of the random orientation, the ratio of $\phi r_{MD}/\phi r_{TD}$ is about 1, and in particular between 0.9 and 1.05 wherein $\phi r_{MD}$ and $\phi r_{TD}$ are the residual magnetic flux densities in the longitudinal and transverse directions of the substrate, respectively.

The ratio of squareness ratio:

$$(\phi r/\phi m)_{MD}/(\phi r/\phi m)_{TD}$$

has almost the same value.

The magnetic particles in the magnetic layer may contain secondary particles.

In the practice of the present invention, the amount of magnetic powder ranges from 100 to 900 parts by weight, and preferably 150 to 600 parts by weight per 100 parts by weight of the binder.

A lubricant may preferably be contained within the pores in the surface of the magnetic layer. The presence of lubricant greatly enhances the durability of the medium. It is preferred to apply a lubricant-containing topcoat layer to the magnetic layer and at the same time introduce the lubricant within the pores. Charging only the pores with lubricant is acceptable if desired. Any conventional known methods may be employed to charge the pores with lubricant, including overcoating of lubricant solution with or without additional rolling or heating for impregnation.

The lubricants used herein include various known types of lubricants, preferably fatty acids and fatty acid esters. The fatty acids that may be employed include those represented by RCOOH wherein R is an saturated or unsaturated alkyl group having at least 7, preferably at least 11 carbons such as caprylic acid, capric acid, lauric acid, myristic acid, palmitic acid, stearic acid, behenic acid, oleic acid, elaidic acid, linolic acid, linolenic acid, and stearolic acid. Most preferred among them are unsaturated fatty acids such as oleic acid, elaidic acid, linolic acid, linolenic acid, and stearolic acid. Fatty acid esters preferred for use herein include those formed by the combination of a monobasic unsaturated or saturated fatty acid having 10 to 22 carbon atoms with a monohydric saturated or unsaturated alcohol having 3 to 22 carbon atoms. The aliphatic chain of the fatty acid and/or alcohol moiety in the ester may be either saturated or unsaturated and may be of various configurations, including normal and iso-structures.

The lubricants may be used alone or in admixture of two or more.

Other lublicants that may be used include metallic soaps such as alkali metal or alkaline earth metal salts of the above-mentioned fatty acids, silicone oil, fluorinated oil, paraffin, liquid paraffin, surfactants, and the like.

The total amount of lubricant used is up to 20 parts by weight, preferably 0.1 to 15 parts by weight per 100 parts by weight of the magnetic powder. Aside from its presence within the magnetic layer, the amount of lubricant filled or impregnated in the pores is preferably at least 10%, more preferably 30 to 130 by volume of all the pores. A value over 100% by volume means that all the pores are completely filled with the lubricant and excess lubricant is present on the surface of the magnetic layer.

The nonmagnetic substrates employed in the invention are generally flexible resins, examples of which include polyesters such as polyethylene terephthalate, polyolefins such as polypropylene, cellulose derivatives such as cellulose triacetate, polyimides, polycarbonates, polysulfones, phlyethylene naphthalate, aromatic aramides, and aromatic polyesters. Of these, polyesters, polyamides, and polyimides are especially desirable.

Magnetic Powder

The magnetic powders used in the magnetic layer according to the present invention include magnetic metal particles, cobalt-coated iron oxide particles, $\gamma$-$Fe_2O_3$ particles, and other magnetic particles. They may be used alone or in admixture.

The magnetic metal particles used herein include (1) those obtained by starting with iron oxyhydroxides such as $\alpha$-FeOOH (goethite), $\beta$-FeOOH (akaganite), and $\gamma$-FeOOH (lepidocrocite); iron oxides such as $\alpha$-Fe$_2$O$_3$, $\gamma$-Fe$_2$O$_3$, Fe$_3$O$_4$, and $\gamma$-Fe$_2$O$_3$-Fe$_3$O$_4$ (solid solution); and iron particles doped with one or more metals selected from Co, Mn, Ni, Ti, Bi, Be, and Ag and having an aluminum or silicon compound adsorbed or applied on their surface, and heat reducing them in a reducing gas stream to produce a magnetic powder consisting of iron or consisting of a major proportion of iron, (2) those obtained by the liquid phase reduction of a metal salt in water with NaBH$_4$, and (3) those obtained by evaporating metals in an inert gas atmosphere under a reduced pressure.

The magnetic metal particles may have a composition consisting essentially of elemental iron, cobalt, and nickel alone, and alloys thereof, and the individual metals and their alloys both having an additional metal added thereto, for example, one or more metals selected from Cr, Mn, Co, and Ni, and optionally, from Zn, Cu, Zr, Al, Ti, Bi, Ag, and Pt.

It is also contemplated to add a minor proportion of a non-metallic element or elements such as B, C, Si, P, and N to these metals. Partially nitrided metal magnetic particles such as Fe$_4$N may also be included.

Also, the magnetic metal particles may have an oxide coating on the surface thereof. The magnetic recording media using magnetic metal particles having an oxide coating are advantageously resistant to any influences of an ambient environment such as a reduction in magnetic flux density due to the influence of temperature and humidity and a deterioration of properties due to the occurrence of rust in the magnetic layer. However, there arises a problem that the magnetic layer has an increased electric resistance which causes troubles due to electric charging during use.

The magnetic metal particles may have needle or acicular form when used in magnetic disks.

The preferred form of $\gamma$-Fe$_2$O$_3$ particle is obtained, for example, by dehydrating $\alpha$-FeOOH (goethite) at 400° C. or higher into $\alpha$-Fe$_2$O$_3$, reducing in hydrogen gas at 350° C. or higher into Fe$_3$O$_4$, and oxidizing at 250° C. or lower.

The cobalt-coated iron oxide particles may preferably be $\gamma$-Fe$_2$O$_3$ particles having Co$^{2+}$ diffused in a thin layer of several to several ten angstrom deep from the surface.

The preferred magnetic powder is of needle magnetic particles having a specific anisotropic profile, that is, an average length (or diameter along the major axis) of up to 2 $\mu$m, especially 0.01 to 1 $\mu$m, and an aspect ratio of at least 3, especially 5 to 15. The aspect ratio used herein is a ratio of average length to average breadth or average diameter along the major axis to average diameter along the minor axis. Media prepared from particles having an aspect ratio of less than 3 exhibit poor electromagnetic performance.

Binder

The needle magnetic material is prepared into a magnetic coating composition with the aid of a binder which may be selected from radiation curable resins, thermoplastic resins, thermosetting resins, and reactive resins, and mixtures thereof.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizaing upon exposure to radiation are resins having maleic or fumaric acid incorporated therein, particularly unsaturated polyester resins having maleic or fumaric acid incorporated therein. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

Typical resins are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade marks, manufactured by U.C.C.), and analogues. These copolymers may be modified to be radiation sensitive by incorporating acrylic, maleic, or allyl double bonds. They may additionally contain carboxylic units.

Also saturated polyester resins, polyvinyl alcohol resins, epoxy resins, phenoxy resins, and cellulosic derivatives may be advantageously employed.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, esters, and acrylic resins containing at least one hydroxyl-containing acrylate or methacrylate as a polymer component. These resins may be used alone or in admixture of two or more.

Elastomers and prepolymers may also be employed and their typical examples are polyurethane elastomers and prepolymers.

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethanol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having a polar terminal group in the form of an OH or COOH group.

Also included are monomers having active hydrogen capable of reacting with an isocyanate group and an unsaturated double bond capable of radiation curing, for example, mono- and diglycerides of long chain fatty acids having an unsaturated double bond. The use of these urethane elastomers in combination with the above-mentioned acryl-modified vinyl chloride copolymers is particularly advantageous in improving surface roughness.

Acrylonitrile-butadiene copolymeric elastomers and polybutadiene elastomers are also useful.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification.

The radiation-curable oligomers and monomers having unsaturated double bonds may be used in the present invention.

The thermoplastic resins used herein are resins having a softening point of lower than about 150° C., an average molecular weight of 10,000 to 200,000, and a degree of polymerization of about 200 to 2,000. Some illustrative nonlimiting examples of the thermoplastic resins include vinyl chloride-vinyl acetate copolymers (which may have carboxylic units incorporated therein), vinyl chloride-vinyl acetate-vinyl alcohol copolymers (which may have carboxylic units incorporated therein), vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, nylon-silicone resins, nitrocellulose-polyamide resins, polyvinyl fluoride, vinylidene-acrylonitrile copolymers, butadiene-acrylonitrile copolymers, polyamide resins, polyvinyl butyral, cellulose derivaties (e.g., cellulose acetate, cellulose diacetate, cellulose triacetate, cellulose propionate, nitrocellulose, etc.), styrene-butadiene copolymers, polyester resins, chlorovinyl ether-acrylate copolymers, amino resins, and various synthetic rubbers; and mixtures of any of the foregoing members.

The preferred thermosetting or reactive resins are those which have a molecular weight of lower than about 200,000 in coating solution and are heat cured, after coating and drying, into a product having an infinite molecular weight by such reactions as condensation and addition reactions. Preferred among them are those which do not soften or melt until the resins are thermally degraded.

Particularly preferred are resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a vinyl copolymer such as a vinyl chloride-vinyl acetate copolymer (which may have carboxylic units incorporated therein), a vinyl chloride-vinyl acetate-vinyl alcohol copolymer (which may have carboxylic units incorporated therein), a vinyl chloride-vinylidene chloride copolymer, a vinyl chloride-acrylonitrile copolymer, vinyl butyral, vinyl formal, etc. with a crosslinking agent; mixtures of a cellulosic resin such as nitrocellulose and cellulose acetobutyrate with a crosslinking agent; mixtures of a synthetic rubber such as butadiene-acrylonitrile with a crosslinking agent; and mixtures thereof.

These thermosetting resins may generally be cured by heating in an oven at about 50° to 80° C. for about 6 to 100 hours.

Among the above-mentioned variety of binders, the radiation-curable resin may most preferably contained in order to enhance the durability and adherence of the magnetic layer.

In crosslinking the magnetic coating composition comprising the radiation-curable resin as a predominant binder, a variety of active energy beams are useful, for example, electron radiation produced by an electron radiation accelerator, gamma-rays emitted from Co60, beta-rays emitted from Sr90, and X-rays produced by an X-ray generator.

One particularly preferred type of radiation for exposure is radiation generated by a radiation accelerator because of ease of control of a dose, simple incorporation in a manufacturing line, and electromagnetic radiation shielding.

Electron radiation may conveniently be used to cure the magnetic coating composition by operating an electron radiation accelerator at an accelerating voltage of 100 to 750 kV, more preferably 150 to 300 kV to generate radiation having a sufficient penetrating power such that the object is exposed to a radiation dose of 0.5 to 20 megarad.

During radiation crosslinking, it is impartant that the radiation be applied to the recording medium in a stream of inert gas such as hydrogen and helium gas. On account of the very high porosity of a magnetic coating having a very high loading of magnetic particles, when radiation is applied to the coating in air, $O_3$ and other by-products due to irradiation prevent the radicals generated within the binder polymer from effectively participating in the crosslinking reaction of the binder. This influence acts not only on the surface of the magnetic layer, but also inhibits crosslinking of the binder within the bulk of the layer on account of its porosity. It is thus crucial that the zone irradiated with activation energy rays be maintained within an atmosphere of inert gas such as nitrogen, helium, and carbon dioxide having a maximum oxygen concentration of 1 percent.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, $\alpha$-methylbenzoin, $\alpha$-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

The magnetic layer may further contain an inorganic pigment. Some illustrative non-limiting examples of the inorganic pigments includes electroconductive pigments such as carbon black, graphite, and graphitized carbon black; and inorganic fillers such as $SiO_2$, $TiO_2$, $Al_2O_3$, $Cr_2O_3$, SiC, CaO, $CaCO_3$, zinc oxide, goethite, $\gamma$-$Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K.K.) and (2) ultrafine anhydrous silicas prepared by pyrolysis of pure silicon tetrachloride (standard product 100 Å; Aerosil manufactured by Nihon Aerosil K.K.). Aluminum oxide, titanium oxide, and the aforementioned finely divided pigments may also be in the form of either (1) colloidal solution of ultrafine particles or (2) ultrafine particulates prepared by a gas phase process as mentioned above for silicon dioxide.

These inorganic pigments may be used in amounts of about 1 to 30 parts by weight for form (1) and 1 to 30 parts by weight for form (2) per 100 parts by weight of the magnetic powder. The use of the inorganic pigments in excess amounts results in a brittle coating which produces more dropouts.

The inorganic pigments may preferalby have a diameter of up to 0.1 $\mu$m, more preferably up to 0.05 $\mu$m for form (1) and up to 0.7 $\mu$m, more preferably up to 0.5 $\mu$m for form (2).

The magnetic coating composition may also contain solvents, dispersing agents, lubricants as indicated above, and such other agents as may be required. No particular limitations exist with regard to the solvents employed, but they should be selected as appropriate with regard to such considerations as solubility of and compatibility with the binder. Examples of the solvents that may be used are ketones such as acetone, methyl ethyl ketone, methyl isobutyl ketone, and cyclohexanone; esters such as ethyl formate, ethyl acetate, and butyl acetate; alcohols such as methanol, ethanol, isopropanol, and butanol; aromatic hydrocarbons such as toluene, xylene, and ethylbenzene; ethers such as isopropyl ether, ethyl ether, and dioxane; and furans such as tetrahydrofuran and furfural. They may be used alone or as solvent mixtures in a proportion of 10 to 10,000% by weight, and preferably 100 to 5,000% by weight based on the weight of the binder.

The magnetic recording medium of the present invention may be manufactured by a conventional process by mixing and dispersing magnetic particles in the binder along with the organic solvent and other additive agents to form a magnetic coating composition. The magnetic coating composition is then applied to a substrate such as polyester film to form a magnetic layer by gravure coating, reverse-roll coating, air knife coating, air doctor coating, blade coating, kiss-roll coating, spray coating, or some other like process. It is preferable that the desired pores be formed forcibly within the magnetic layer by, for example, applying a magnetic field in a transverse direction across the substrate, or an alternating magnetic field, before curing of the magnetic layer such as to eliminate the mechanical orientation of the magnetic particles within the magnetic coating composition due to shearing stresses during the coating process. This may be followed by drying, and preferably radiation-curing by a standard process. The lubricant is then introduced into the forcibly formed pores by overcoating a lubricant solution followed by optional rolling or heating for impregnation. Any known topcoats and the like may then be applied as necessary.

According to the present invention, a magnetic recording medium contains needle magnetic powder in the magnetic layer in which pores with an average pore area of $6 \times 10^{-5}$ to $7 \times 10^{-1}$ $\mu m^2$ are preferably formed to a magnetic layer porosity of 5 to 30%. In the preferred embodiment of the invention wherein the lubricant is present within these pores, the medium has minimized output fluctuations, particularly minimized high-pass modulation and is fully durable.

EXAMPLES

In order that those skilled in the art will better understand the practice of the present invention, examples of the present invention will be described below. Several abbreviations are used, for example, Hc is coercive force in oersted, MW is molecular weight, PET is polyethylene terephthalate, and MEK is methyl ethyl ketone.

EXAMPLE 1

Magnetic Coating Composition 1

A magnetic coating base having the following composition was prepared.

| Ingredient | Parts by weight |
| --- | --- |
| Cobalt-coated $\gamma$-$Fe_2O_3$ (length 0.4 $\mu$m, breadth 0.005 $\mu$m, Hc 600 Oe) | 120 |
| Carbon black (antistatic, Mitsubishi Carbon Black MA-600) | 10 |
| $\alpha$-$Al_2O_3$ (particulate, 0.5 $\mu$m) | 2 |
| Dispersant (soybean lecithin) | 3 |

-continued

| Ingredient | Parts by weight |
| --- | --- |
| Solvent (50/50 MEK/toluene) | 100 |

These ingredients were milled for 3 hours in a ball mill to fully wet the needle magnetic ferric oxide with the dispersant. Separately, a binder compound was prepared by fully mixing the following ingredients into a solution.

| Ingredient | Parts by weight |
| --- | --- |
| Vinyl chloride-vinyl acetate-vinyl alcohol copolymer (containing 1% maleic acid, MW = 40,000) | 6 (solids) |
| Acrylic double bond-incorporated vinyl chloride-vinyl acetate-vinyl alcohol copolymer (containing maleic acid, MW = 20,000) | 12 (solids) |
| Acrylic double bond-incorporated polyether urethane elastomer (MW = 40,000) | 9 (solids) |
| Pentaerythritol triacrylate | 3 |
| Solvent (50/50 MEK/toluene) | 200 |
| Stearic acid | 4 |
| Butyl stearate | 2 |

The binder compound was added to the magnetic coating base in the ball mill and milled for dispersion for a further 42 hours. The thus obtained magnetic coating composition was applied onto a polyester (PET) film of 75 μm thick by reverse-roll coating to a dry thickness of 2.0 μm. Immediately thereafter, the coated film was subjected to a magnetic field treatment using an a.c. solenoil coil with a magnetic field strength range of 50 to 1000 G.

The coated film was then cured by irradiating it with electron radiation in a nitrogen atmosphere using an electron-curtain type electron beam accelerator (manufactured by ESI) operating under an accelerating voltage of 150 keV and an electrode current of 20 mA to a total dose of 5 Mrad.

After the coated film was cured in this way, samples of the medium were fabricated by punching out the product in the shape of 3.5-inch disks. As shown in Table 1, several different samples were prepared by varying the magnetic field treatment and the mixing ratio of the binder and magnetic powder in order to obtain media having different magnetic layer porosities.

Another series of samples were fabricated by the above-described procedures using magnetic coating compositions as formulated below.

Magnetic Coating Composition 2

A magnetic coating base having the following composition was prepared.

| Ingredient | Parts by weight |
| --- | --- |
| Iron alloy needle magnetic powder (length 0.3 μm, breadth 0.4 μm, Hc 1100 Oe) | 120 |
| Dispersant (oleic acid) | 2 |
| Solvent (50/50 MEK/toluene) | 100 |

These ingredients were mixed for 3 hours in a high intensity mixer to fully wet the magnetic alloy powder with the dispersant. Separately, a binder compound was prepared by fully mixing the following ingredients into a solution.

| Ingredient | Parts by weight |
| --- | --- |
| Vinyl chloride-vinyl acetate-vinyl alcohol copolymer (containing 1% maleic acid, MW = 20,000) | 10 (solids) |
| Acryl-modified phenoxy (MW = 35,000) | 6 (solids) |
| Acryl-modified polyether urethane elastomer (MW = 20,000) | 24 (solids) |
| Solvent (70/30 MEK/cyclohexanone) | 200 |
| Higher fatty acid-modified silicone oil | 3 |
| Butyl myristate | 3 |

The binder compound was thoroughly mixed with the magnetic powder mixture for one hour in a high speed mixer. The resulting magnetic coating composition was milled and dispersed for four hours using a sand mill.

Magnetic Coating Composition 3

A magnetic coating base having the following composition was prepared.

| Ingredient | Parts by weight |
| --- | --- |
| $\gamma$-Fe$_2$O$_3$ (length 0.8 μm, breadth 0.2 μm, Hc 300 Oe) | 120 |
| Carbon black (antistatic, Mitsubishi Carbon Black MA-600) | 10 |
| $\alpha$-Al$_2$O$_3$ (particulate, 0.5 μm) | 2 |
| Dispersant (sorbitan monooleate) | 3 |
| Solvent (50/50 MEK/toluene) | 100 |

These ingredients were milled for 3 hours in a ball mill to fully wet the magnetic iron oxide powder with the dispersant. Separately, a binder compound was prepared by fully mixing the following ingredients into a solution.

| Ingredient | Parts by weight |
| --- | --- |
| Vinyl chloride-vinyl acetate-vinyl alcohol copolymer (UCARMAG-528, Union Carbide Corp.) | 15 (solids) |
| Urethane (Nippolan-3022, Nihon Polyurethane K.K.) | 15 (solids) |
| Solvent (70/30 MEK/cyclohexanone) | 200 |
| Higher fatty acid-modified silicone oil | 3 |
| Butyl myristate | 3 |

The binder compound was thoroughly mixed with the magnetic powder mixture for one hour in a high speed mixer. The resulting magnetic coating composition was milled and dispersed for four hours using a sand mill. At the end of dispersion, 5 parts (calculated as solids) of an isocyanate compound (Colonate L, Nihon Polyurethane K.K.) was added to the magnetic coating composition. Instead of being radiation-cured, the coatings of magnetic coating composition 3 were heat treated and dried at 60° C. for 24 hours.

The cured coatings or magnetic layers were measured to have a thickness of 1.5 μm using an electron micrometer.

The coating films were formed on both sides of the base film to produce double-sided samples.

In some samples (sample Nos. 8–10, 13, 15), oleic acid and oleyl oleate were mixed in a 1:1 proportion to form a lubricant, which was then applied to the surface of the magnetic layer and impregnated within the pores in the magnetic layer. Table 1 gives the amount of lubricant impregnated within the magnetic layer in percent by volume.

The samples of the magnetic recording media thus fabricated were measured for the following properties.

The effects of the present invention are clear from the results shown in Table 1.

TABLE 1

| Sample No. | Magnetic coating composition | Lubricant content (vol %) | Average pore surface area ($\mu m^2$) | Average porosity (%) | High-pass modulation | Durability (thousands of passes) |
| --- | --- | --- | --- | --- | --- | --- |
| 1 | 1 | 0 | 0.0008 | 22 | very good | 500 |
| 2 | 1 | 0 | 0.008 | 20 | very good | 1,000 |
| 3 | 1 | 0 | 0.2 | 21 | good | 1,500 |
| 4 | 1 | 0 | 0.03 | 22 | good | 2,000 |
| 5* | 1 | 0 | 1.2 | 28 | very bad | 3,500 |
| 6* | 1 | 0 | 1.2 | 40 | very bad | 5,000 |
| 7 | 1 | 0 | 0.03 | 2 | very good | 100 |
| 8 | 1 | 50 | 0.03 | 22 | good | 21,000 |
| 9 | 1 | 85 | 0.03 | 20 | very good | 28,000 |
| 10* | 1 | 85 | 1 | 18 | very bad | 30,000 |
| 11 | 2 | 0 | 0.03 | 20 | very good | 1,500 |
| 12* | 2 | 0 | 1 | 35 | very bad | 3,000 |
| 13 | 2 | 85 | 0.03 | 25 | very good | 25,000 |
| 14 | 3 | 0 | 0.03 | 20 | good | 3,000 |
| 15 | 3 | 80 | 0.03 | 21 | good | 28,000 |

*Comparative examples (1) Average pore surface area ($\mu m^2$)

Measured by the electron microscopy described above using a scanning electron microscope.

(2) Porosity (%)

Determined from the measurements obtained using the mercury injection method described above.

(3) High-pass modulation

The output fluctuation ratio which is predominantly determined by the track average of the difference between the maximum amplitude A' and the minimum amplitude B' as shown in FIG. 1 was measured. It is classified into the following five ratings.

| Rating | Percent output fluctuation (F) |
| --- | --- |
| very good | $F \leq 3\%$ |
| good | $3\% < F \leq 4\%$ |
| fair | $4\% < F \leq 7\%$ |
| poor | $7\% < F \leq 10\%$ |
| very poor | $10\% < F$ |

(4) Durability

The samples were subjected to temperature and humidity cycles of 0°–60° C. and 10% RH, and the number of passes until the signal could no longer be read off measured. The results are shown in Table 1.

As a result of measurements, the modulation was found to be about 4% for all the samples. The value of $\phi r_{MD}/\phi r_{TD}$ was about 1.

We claim:

1. A method for preparing a disk-shaped magnetic recording medium, comprising:

applying a magnetic coating composition comprising a needle magnetic material and a binder to a nonmagnetic flexible resin substrate to form a magnetic layer, and subjecting the magnetic layer to random orientation to form therein pores having an average pore area of $6 \times 10^{-5}$ to $7 \times 10^{-1}$ $\mu m^2$, and punching the coated substrate into a disk shape.

2. A method for preparing a disk-shaped magnetic recording medium according to claim 1, further comprising curing said randomly oriented magnetic layer at temperature between 50° C. and 80° C.

3. A method for preparing a disk-shaped magnetic recording medium, comprising:

applying a magnetic coating composition comprising a needle magnetic material and a binder to a nonmagnetic flexible-resin substrate to form a magnetic layer, subjecting the magnetic layer to random orientation to form therein pores with an average pore area of $6 \times 10^{-5}$ to $7 \times 10^{-1}$ $\mu m^2$, applying a lubricant at least into the pores, and punching the coated substrate into a disk shape.

4. A method for preparing a disk-shaped magnetic recording medium according to claim 3, further comprising curing said randomly oriented magnetic layer at temperatures between 50° C. and 80° C.

* * * * *